United States Patent Office 3,363,021
Patented Jan. 9, 1968

3,363,021
PROCESS FOR REMOVING AN ALUMINUM TRIALKYL IMPURITY FROM A REACTION MIXTURE
Edmond R. Tucci, Pittsburgh, Pa., assignor to Gulf Research & Development Company, Pittsburgh, Pa., a corporation of Delaware
No Drawing. Filed June 1, 1964, Ser. No. 371,826
9 Claims. (Cl. 260—677)

ABSTRACT OF THE DISCLOSURE

A process for removing an aluminum trialkyl from a mixture which comprises treating the mixture with an ether, an amine or a sulfine to form a complex between the aluminum trialkyl and the ether, amine or sulfine, treating the complex with sodium, potassium, rubidium or cesium fluoride, cesium chloride or a complex of an aluminum trialkyl and of one of such alkali metal halides, thereby freeing the ether, amine or sulfine from the first-named complex and forming a resulting complex between the first-named aluminum trialkyl and one of the defined alkali metal halides.

---

This invention relates to a process for purifying a hydrocarbon mixture contaminated with an aluminum alkyl.

Hydrocarbons can often be found in admixture with contaminating amounts of aluminum alkyls, and methods are available for purifying said hydrocarbons of said aluminum trialkyls. For example, such mixtures can be subjected to hydrolysis with water to convert the aluminum alkyls to the corresponding aluminum hydroxides, and the treated mixture can then be subjected to distillation conditions to recover overhead the purified hydrocarbon. In some cases, however, such methods are expensive and may not be commercially or technically feasible, and therefore it is desirable to possess an alternative or improved method for obtaining the desired purification.

We have found that a mixture containing at least one hydrocarbon and at least one aluminum trialkyl can be purified of said aluminum trialkyl by following a procedure which involves treating such mixture with a Lewis Base.

Hydrocarbons that can be purified in accordance with the dictates of this invention are hydrocarbons that will remain in the liquid state throughout the procedure defined and claimed herein. By "hydrocarbon" I intend to include organic compounds, with or without substituent groups, composed solely of carbon and hydrogen. Such hydrocarbons are not adversely affected by the reaction conditions employed herein, nor do they react with the Lewis Base or other materials employed herein. In general the hydrocarbons will have a boiling point at atmospheric pressure below about 250° C. Thus, the hydrocarbons can be composed of alkanes or cycloalkanes having from one to 14 carbon atoms, such as, n-pentane, n-hexane, n-heptane, n-octane, n-nonane, n-decane, n-undecane, n-dodecane, n-tridecane, n-tetradecane, 3-methylhexane, 2,3 - dimethylpentane, 3-ethyl-3-methylpentane, 2,2,4-trimethylpentane, 2,2,3,3-tetramethylbutane, 4-ethyl-2-methylhexane, 3-ethyl-2,2-dimethylpentane, 4-ethyl-2,2-dimethylpentane, 4-ethyl-3-methylpentane, 3-isopropyl-2-methylhexane, 2,2,3,4,4-pentamethylpentane, cyclopentane, cyclohexane, cycloheptane, cyclooctane, cyclodecane, etc.; olefins having from two to 16 carbon atoms, such as, ethylene, butane-1, pentene-1, hexene-1, heptene-1, octene-1, hexene-2, heptene-3, octene-3, butene-2, 3-methyl-1-butene, 2-methyl-2-pentene, 2,3-dimethyl-2-butene, 2,4-dimethyl-1-pentene, 6-methyl-1-heptene, 2,4-dimethyl-1-hexene, decene-1, dodecene-1, hexadecene-1, etc.; aromatic hydrocarbons having from six to 10 carbon atoms, such as, benzene, toluene, xylenes, ethylbenzene, cumenes, mesitylenes, p-cymene, methylethylbenzene, etc.

As will be pointed out below, the procedure, in a preferred embodiment, involves in addition to the treatment of the hydrocarbon with a Lewis Base, a subsequent step wherein the aluminum trialkyl-Lewis Base complex in said hydrocarbon is complexed with a compound selected from the group consisting of alkali metal halides of the formula:

MF and CsCl and complexes of said alkali metal halides and aluminum trialkyls of the formula:

$AlR_3 \cdot MF$ and $AlR_3' \cdot CsCl$ wherein M is selected from the group consisting of sodium, potassium, rubidium and cesium, R is selected from the group consisting of alkyls having from one to eight carbon atoms, preferably from one to four carbon atoms, and R' is selected from the group consisting of alkyls having from two to four carbon atoms. The number of carbon atoms in the alkyl portion of said complexes will correspond to the number of carbon atoms in the alkyl portion of the aluminum trialkyls being removed from the hydrocarbon mixture.

The aluminum trialkyl impurity that can be removed from the hydrocarbon defined above are those aluminum trialkyls that will form 1:1 and ultimately 2:1 (aluminum trialkyl: alkali metal halide) molar complexes with the alkali metal halides defined above. Aluminum trialkyls, wherein each alkyl substituent has from one to eight carbon atoms, preferably from one to four carbon atoms, will form 1:1 molar and ultimately 2:1 molar complexes with NaF, KF, RbF and CsF. Although aluminum trialkyls, wherein each alkyl substituent has from one to eight carbon atoms, will react with CsCl to form a 1:1 molar complex therewith, only aluminum trialkyls, wherein each alkyl substituent has from two to four carbon atoms, for example, ethyl, normal propyl, isopropyl, normal butyl and isobutyl, will ultimately form a 2:1 molar complex therewith. Alkyl aluminum halides, such as alkyl aluminum dichlorides or dialkyl aluminum chlorides, cannot be removed from the hydrocarbons defined herein, since a halogen interchange will occur between said alkyl aluminum halides and the defined alkali metal fluoride or the 1:1 molar complex of aluminum trialkyl and alkali metal fluoride. Sodium, potassium, or rubidium chlorides, bromides or iodides or cesium bromides or iodides cannot be employed in thre purification procedure defined herein, since they will either not complex with the defined aluminum trialkyl impurities, or where they will form a 1:1 molar complex with said aluminum trialkyls, they will not ultimately form a 2:1 molar complex therewith. Under the reaction conditions employed herein a 1:1 molar complex of NaF and an aluminum trialkyl, wherein each alkyl substituent has from one to four carbon atoms, is a solid. The 2:1 molar complex of NaF and said aluminum trialkyls, however, is a liquid. Each of the 1:1 and 2:1 molar complexes of the aluminum trialkyls and KF, RbF, CsF and CsCl formed herein are solid.

The procedure of this invention can be illustrated as follows. To the hydrocarbon mixture containing the defined aluminum trialkyl impurity there is added at least the stoichiometric amount of a strong or moderately strong Lewis Base sufficient to form a 1:1 molar complex with said aluminum trialkyl impurity. By "Lewis Base" I intend to include substances capable of donating a share of an electron pair with a Lewis Acid. By "Lewis Acid" I intend to include compounds wherein one of its atoms has the ability to accept a share in a pair of electrons from another substance (Lewis Base) with formation of a coordinate covalent bond. Examples of a Lewis Base that can be employed herein are dibenzylether, di-n-butylether, di-n-amylether, di-n-hexylether, di-n-heptylether, di-n-octylether, tetrahydrofuran, 1,4-dioxane, bis[2-(-methoxyethoxy)ethyl] ether, bis (2-phenoxyethyl) ether, bis (alphamethylbenzyl) ether, tri-n-amylamine, tri-n-butylamine, tri-n-heptylamine, tri-n-hexylamine, tri-n-octylamine, N,N-diethyldodecylamine, N-phenyldibenzylamine, tri-n-propylphosphine, tri-n-butylphosphine, tri-n-hexylphosphine, methylbutylsulfine, methylphenylsulfine, dibutylsulfine, etc. Examples of a Lewis Acid within the context defined above are aluminum trichloride, aluminum tribromide, aluminum trifluoride, boron trifluoride, boron trichloride, boron trimethyl, gallium trichloride, beryllium chloride, zinc chloride, aluminum trimethyl, aluminum triethyl, aluminum tri-n-propyl, aluminum tri-n-butyl, aluminum tri-n-hexyl, aluminum tri-n-heptyl, aluminum tri-n-octyl, gallium trimethyl, etc. I prefer to employ dibenzyl ether as a Lewis Base for complexing with the aluminum trialkyl impurity.

The formation of the 1:1 molar complex of the Lewis Base and the aluminum trialkyl impurity proceeds rapidly at room temperature and atmospheric pressure. However, if desired a temperature of about −30° to about 100° C., preferably about 10° to about 50° C., a pressure of about 15 to about 150 pounds per square inch gauge, preferably about 15 to about 20 pounds per squire inch gauge, and a residence time of about five to about 60 minutes, preferably about five to about 10 minuts, can be employed. In the event the Lewis Base employed is a liquid and the 1:1 molar complex formed between the aluminum trialkyl impurity and said Lewis Base is also a liquid, the resultant mixture can be subjected to distillation at a temperature of about 25° to about 150° C. and a pressure of about 0.0002 to about 15 pounds per square inch gauge to remove overhead the purified hydrocarbon and to leave behind the aluminum trialkyl-Lewis Base complex. However, if the Lewis Base employed is a solid and the complex thus formed, or otherwise formed, is a solid, simple filtration or decantation is sufficient to separate the purified hydrocarbon from the complex containing the aluminum trialkyl impurity.

Under the preferred embodiment of this invention the Lewis Base is recovered from the complex formed with the aluminum trialkyl impurity. To the complex there is added at least the stoihciometric amount of NaF, KF, RbF, CsF or CsCl sufficient to form a 2:1 molar complex between the aluminum trialkyl impurity, now complexed with the Lewis Base, and said alkali metal halide and thereby free the Lewis Base therefrom. In the event the 1:1 molar complex composed of Lewis Base and the aluminum trialkyl impurity being treated is a liquid, the mixture resulting from the addition thereto of said alkali metal halide is merely stirred during the reaction. However, if the resulting mixture is composed of solids, a solvent, preferably a normal paraffin solvent, such as, n-pentane, n-hexane, n-heptane, n-octane, n-decane, n-dodecane, cyclopentane, cyclohexane, cycloheptane, cyclooctane, etc., is added thereto to facilitate the desired reaction. During this reaction pressures do not appear to affect the course thereof. The temperature, however, must be high enough to break the Lewis Base-aluminum trialkyl complex and to result in the formation of the 2:1 complex between the aluminum trialkyl and alkali metal halide, but not so high that decomposition of the aluminum trialkyl takes place. Thus the temperature can be from about 25° to about 150° C., preferably about 50° to about 100° C. Pressure can be, for example, from about 0.0002 to about 15 pounds per square inch gauge, preferably about 0.02 to about five pounds per square inch gauge, and reaction time about five to about 120 minutes, preferably about 15 to about 30 minutes.

The recovery of the freed Lewis Base from the 2:1 trialkyl aluminum-alkali metal halide complex formed is dependent upon the physical states thereof. In the event the 2:1 complex is a solid and the Lewis Base is a liquid distillation of the mixture at a temperature of about 25° to about 150° C. and a pressure of about 0.0002 to about 15 pounds per square inch gauge is sufficient to recover the Lewis Base overhead, leaving behind the 2:1 complex. Alternatively the Lewis Base can be recovered by extraction using a normal paraffin as defined above. The normal paraffin employed in the latter instance can be recovered by subjecting the extract to distillation at a temperature of about 25° to about 150° C. and a pressure of about 0.0002 to about 15 pounds per square inch gauge. In the event the Lewis Base is a solid and the 2:1 complex is either a solid or a liquid, extraction of the Lewis Base with a normal paraffin, as noted above, is effective. The Lewis Base so recovered can, in a preferred embodiment, again be employed to form the desired 1:1 molar complex with the aluminum trialkyl impurity in the original hydrocarbon charge.

In a preferred embodiment the 2:1 molar complex formed between the alkali metal halide defined above and the aluminum trialkyl impurity is subjected to decomposition conditions in order to obtain equal molar amounts of free aluminum trialkyl and a 1:1 molar complex of said aluminum trialkyl and said alkali metal halide. This can be done, for example, by subjecting the 2:1 complex to a temperature of about 170° to about 240° C., preferably about 170° to about 210° C., and a pressure of about 0.0002 to about 0.02 pound per square inch, preferably about 0.01 to about 0.02 pound per square inch gauge, for about 10 to about 60 minutes, preferably about 10 to about 30 minutes. In such case the 1:1 molar complex thus formed can be employed in place of the defined alkali metal halide in the reaction with the Lewis Base-aluminum trialkyl complex to form the 2:1 molar complex of aluminum trialkyl-alkali metal halide. When this is done, of course, no alkali metal halide, other than make-up, need be introduced into the system.

A particularly attractive process wherein the invention defined herein can effectively be employed is the process wherein normal alpha olefins are produced by reaction of ethylene with itself in the presence of an aluminum trialkyl, wherein said alkyl portion has from two to four carbon atoms, preferably two, at a temperature of about 120° to about 300° C., preferably 150° C., and a pressure of about 1500 to about 3000 pounds per square inch gauge for about one to about three minutes residence time. The reaction mixture obtained, which was transalkylated with low molecular weight olefins, preferably ethylene in the absence or presence of a catalyst such as nickel, at a temperature of about 95° to about 325° C., preferably 300° C., and a pressure of about 150 to about 2500 pounds per square inch gauge for about 0.5 to about 2 seconds residence time, contains unreacted ethylene, normal alpha olefins having an even number of carbon atoms from four to 20 or more and the aluminum trialkyl, preferably triethylaluminum. Ethylene and butene-1 can be removed from this mixture by flashing to the atmosphere. The $C_6$ and $C_{10}$ normal alpha olefins can be recovered easily from the remaining mixture by distilling the mixture at a temperature of about 25° to about 40° C. and a pressure of about 0.2 to about 5 pounds per square inch gauge. $C_{12}$, $C_{14}$ and some $C_{16}$ normal alpha olefins and trialkyl aluminum, preferably triethylaluminum, can be recovered by distilling at a temperature of about 80° to about 90° C. and a pressure of about 0.01 to 0.02 pound per square inch gauge. Most of the $C_{16}$ and all of the higher normal alpha olefins are recovered in the distillation pot.

The $C_{12}$ and $C_{14}$ normal alpha olefins cannot be removed from the trialkylaluminum mixture by distillation since the trialkylaluminum impurities azeotrope therewith. Accordingly, to the mixture at this point there is added sufficient Lewis Base to form a 1:1 molar complex with the aluminum trialkyl impurity. The C₁₂, C₁₄ and small amounts of C₁₆ olefins are removed from the complex so formed by distillation or by extraction with a paraffin. The complex left behind is then treated with either the defined alkali metal halide or the 1:1 molar complex of said alkali metal halide and aluminum trialkyl to form the 2:1 molar complex of said alkali metal halide and aluminum trialkyl and thereby release the Lewis Base in the manner described. Having previously removed the Lewis Base the 2:1 complex is then decomposed to the corresponding 1:1 complex and aluminum trialkyl. The aluminum trialkyl can be recycled to the polymerization stage, the Lewis Base can be recycled to form the defined complex with the aluminum trialkyl impurity and the 1:1 aluminum trialkyl-alkali metal halide complex can be recycled to form the corresponding 2:1 complex.

The invention can further be illustrated as follows:

*Example I*

To a 250 milliliter Claissen distillation flask there was added 23 grams of dodecene-1, 11.4 grams of tetradecene-1 and 4.0 grams of hexadecene-1. The flask and vacuum distillation system was flushed with dry nitrogen, and then 5.78 grams of aluminum triethyl was added to the olefin mixture. To the mixture in the flask there was then added 15.6 grams of dibenzyl ether, which was approximately 0.02 mol in excess of the amount sufficient stoichiometrically to combine with the aluminum triethyl to form a complex therewith. The system was then evacuated to 1.0 millimeter of mercury while the contents of the flask was stirred for several minutes with the aid of a magnetic stirring bar. The first fraction collected within the temperature range of 25° to 59° C. at 1.0 millimeter of mercury contained 98 weight percent of the total dodecene, 35 weight percent of the tetradecene, traces of the hexadecene, but no free aluminum trialkyl. The second fraction collected between 72° and 79° C. at 1.0 millimeter of mercury contained approximately two weight percent dodecene, 64 weight percent tetradecene, 55 weight percent hexadecene and 100 parts per million of aluminum triethyl. The third and final fraction, which was collected between 82° and 89° C. at 1.0 millimeter of mercury contained 43 weight percent of hexadecene, 12 weight percent dibenzyl ether, which was equivalent to the uncomplexed excess dibenzyl ether initially introduced and 0.1 weight percent free triethylaluminum. Several percent of olefin was lost in column hold-up.

*Example II*

The remaining liquid in the distillation pot in Example I, which is the dibenzyl ether-aluminum triethyl complex, was permitted to cool to room temperature and the system was pressurized to atmospheric pressure with nitrogen gas. Since the 2:1 (aluminum triethyl-potassium fluoride) complex is to be made by reacting the 0.051 mol of aluminum triethyl complexed with the dibenzyl ether, 0.0255 mol of anhydrous potassium fluoride were introduced into the distillation pot containing the dibenzyl ether-aluminum triethyl complex. The system was evacuated to 1.0 millimeter of mercury and the temperature of the distillation pot was slowly raised to 80° C. while vigorously mixing. The solid white potassium fluoride went into solution to form the Al₂(C₂H₅)₆·KF complex and free dibenzyl ether. The temperature of the pot was increased until the dibenzyl ether distilled over at 90° to 95° C. at 1.0 millimeter of mercury. When all of the dibenzyl ether was removed, the solid Al₂(C₂H₅)₆·KF complex was decomposed at 200° C. at 1.0 millimeter of mercury for 15 minutes, and there was recovered 5.49 grams of aluminum triethyl as distillate. The solid remaining in the distillation pot was the 1:1 complex, Al(C₂H₅)₃·KF which is more stable than the corresponding 2:1 complex, and will not decompose as readily. Since the

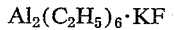

complex reacts rapidly with one mol of aluminum triethyl at approximately 60° to 80° C., it can be employed in place of the pure anhydrous potassium fluoride. Thus, the Al(C₂H₅)₃·KF complex which formed as a result of the decomposition of the Al₂(C₂H₅)₆·KF complex may be recycled to the dibenzyl ether·aluminum triethyl complex and, at the same time, reduce the reaction conditions to form free dibenzyl ether and Al₂(C₂H₅)₆·KF complex. Gas chromatography and infrared analysis of the olefins indicated no isomerization or dimerization resulted from the described procedure.

*Example III*

Exactly 150.5 grams of dodecene-1 and 151.9 grams of tetradecene-1 were added to a 1000 milliliter Claissen distillation flask, which was then flushed with dry nitrogen, and 45.4 grams (0.3973 mol) of aluminum triethyl was added thereto. To the resulting mixture there was added 103.9 grams (0.524 mol) of freshly distilled dibenzyl ether, which is approximately 0.127 mol in excess of that required stoichiometrically to form a complex with the aluminum triethyl. The vacuum distillation system was then evacuated to 1.0 millimeter of mercury while the contents of the flask was stirred for several minutes with the aid of a magnetic stirring bar. The temperature of the flask was slowly increased while maintaining the pressure at 1.0 millimeter of mercury. The first fraction collected between 25° and 80° C. at 1.0 millimeter of mercury contained all of the dodecene and tetradecene initially present and less than 50 parts per million of aluminum trialkyl. The second fraction which distilled in the temperature range of 82° to 90° C. at 1.0 millimeter of mercury contained the excess, uncomplexed dibenzyl ether, trace amounts of tetradecene and less than 100 parts per million of aluminum triethyl.

*Example IV*

The dibenzyl ether·aluminum triethyl complex remaining in the distillation pot after removal of the normal alpha olefins and excess dibenzyl ether therefrom, was allowed to cool to room temperature and the system was pressurized to atmospheric pressure with nitrogen gas. Exactly 11.54 grams (0.199 mol) of anhydrous potassium fluoride was introduced into the distillation pot containing the dibenzyl ether·aluminum triethyl complex. The system was evacuated to 1.0 millimeter of mercury and the temperature of the distillation pot was slowly raised to 80° C. while vigorously stirring. The solid white potassium fluoride went into solution to form the $$Al_2(C_2H_5)_6 \cdot KF$$

complex and free dibenzyl ether. The dibenzyl ether was removed at 90° to 100° C. at 1.0 millimeter of mercury. After complete removal of dibenzyl ether, the $$Al_2(C_2H_5)_6 \cdot KF$$

complex in the distillation pot was heated to 200° C. at 1.0 millimeter of mercury and the free aluminum triethyl was recovered as distillate. The normal alpha olefins were found to undergo no degradation or dimerization by gas chromatographic and infrared analysis.

Obviously, many modifications and variations of the invention, as hereinabove set forth, can be made without departing from the spirit and scope thereof, and therefore only such limitations should be imposed as are indicated in the appended claims.

I claim:

1. A process for removing an aluminum trialkyl from an alpha olefin mixture obtained as a result of the polymerization of ethylene in the presence of aluminum triethyl at elevated temperatures and pressures which comprises treating said mixture with a base selected from the group consisting of dibenzylether, di-n-butylether, di-n-amylether, di-n-hexylether, di-n-heptylether, di-n-octylether, tetrahydrofuran, 1,4-dioxane, bis [2-(2-methoxyethoxy)

ethyl] ether, bis (2-phenoxyethyl) ether, bis (alpha-methylbenzyl) ether, tri-n-amylamine, tri-n-butylamine, tri-n-heptylamine, tri-n-hexylamine, tri-n-octylamine, N,N-diethyldodecylamine, N-phenyldibenzylamine, tri-n-propylphosphine, tri-n-butylphosphine, tri-n-hexylphosphine, methylbutylsulfine, methylphenylsulfine and dibutylsulfine, to form a complex between said aluminum trialkyl and said base, separating said hydrocarbon from said complex and treating said complex with a compound selected from the group consisting of alkali metal halides of the formula MF and CsCl and complexes of said alkali metal halides and aluminum trialkyls of the formula $AlR_3 \cdot MF$ and $AlR_3' \cdot CsCl$ wherein M is selected from the group consisting of sodium, potassium, rubidium and cesium, R is an alkyl group having from one to eight carbon atoms and R' is an alkyl group having from two to four carbon atoms to form a 2:1 molar complex of said aluminum trialkyl and said compound and thereby obtain free base.

2. The process of claim 1 wherein said base is an ether selected from the group consisting of dibenzylether, di-n-butylether, di-n-amylether, di-n-hexylether, di-n-heptylether, di-n-octylether, tetrahydrofuran, 1,4-dioxane, bis [2-(2-methoxyethoxy) ethyl] ether, bis (2-phenoxyethyl) ether, and bis (alpha-methylbenzyl) ether, and said alkali metal halide is KF.

3. The process of claim 1 wherein said base is an amine selected from the group consisting of tri-n-amylamine, tri-n-butylamine, tri-n-heptylamine, tri-n-hexylamine, tri-n-octylamine, N,N-diethyldodecylamine, and N-phenyldibenzylamine, and said alkali metal halide is KF.

4. The process of claim 1 wherein said base is sulfine selected from the group consisting of methylbutylsulfine, methylphenylsulfine, and dibutylsulfine, and said alkali metal halide is KF.

5. The process of claim 1 wherein said base is a phosphine selected from the group consisting of tri-n-propylphosphine, tri-n-butylphosphine, and tri-n-hexylphosphine, and said alkali metal halide is KF.

6. A process for removing an aluminum triethyl from an alpha olefin mixture obtained as a result of the polymerization of ethylene in the presence of aluminum triethyl at elevated temperatures and pressures which comprises treating said mixture with dibenzyl ether to form a complex between said aluminum trialkyl and said dibenzyl ether, separating said hydrocarbon from said complex and treating said complex with KF to form a 2:1 molar complex of said aluminum trialkyl and said KF and thereby obtain free dibenzyl ether.

7. A process for removing an aluminum triethyl from an alpha olefin mixture obtained as a result of the polymerization of ethylene in the presence of aluminum triethyl at elevated temperatures and pressures which comprises treating said mixture with dibenzyl ether to form a complex between said aluminum trialkyl and said dibenzyl ether, separating said hydrocarbon from said complex, treating said complex with KF to form a 2:1 molar complex of said aluminum triethyl and said KF and thereby obtain free dibenzyl ether, separating said dibenzyl ether from said 2:1 molar complex and decomposing said 2:1 molar complex to obtain the corresponding 1:1 complex and aluminum trialkyl.

8. A process for removing an aluminum triethyl from an alpha olefin mixture obtained as a result of the polymerization of ethylene in the presence of aluminum triethyl at elevated temperatures and pressures which comprises treating said mixture with dibenzyl ether to form a complex between said aluminum trialkyl and said dibenzyl ether, separating said hydrocarbon from said complex and treating said complex with $Al(C_2H_5)_3 \cdot KF$ to form the complex $2Al(C_2H_5)_3 \cdot KF$.

9. A process for removing an aluminum triethyl from an alpha olefin mixture obtained as a result of the polymerization of ethylene in the presence of aluminum triethyl at elevated temperatures and pressures which comprises treating said mixture with dibenzyl ether to form a complex between said aluminum trialkyl and said dibenzyl ether, separating said hydrocarbon from said complex, treating said complex with $Al(C_2H_5)_3 \cdot KF$ to form the complex $2Al(C_2H_5)_3 \cdot KF$ and thereby obtain free dibenzyl ether, separating said dibenzyl ether from said 2:1 molar complex and decomposing said 2:1 molar complex to obtain the corresponding 1:1 complex and aluminum trialkyl.

References Cited
UNITED STATES PATENTS

| | | | |
|---|---|---|---|
| 3,119,854 | 1/1964 | Ziegler et al. | 260—448 X |
| 2,889,385 | 6/1959 | Catteral et al. | 260—683.15 |
| 3,035,105 | 5/1962 | Hoffman | 260—683.15 |
| 3,119,854 | 1/1964 | Ziezler et al. | 260—448 X |
| 3,225,113 | 12/1965 | McNulty et al. | 260—677 |
| 3,249,648 | 5/1966 | Carter et al. | 260—683.15 |

PAUL M. COUGHLAN, Jr., *Primary Examiner.*

UNITED STATES PATENT OFFICE

CERTIFICATE OF CORRECTION

Patent No. 3,363,021

January 9, 1968

Edmond R. Tucci

It is hereby certified that error appears in the above numbered patent requiring correction and that the said Letters Patent should read as corrected below.

Column 1, line 65, for "butane-1" read -- butene-1 --; column 5, line 57, for "not" read -- pot --; column 8, line 42. for "3,119.854  1/1964  Ziegler et al.----- 260-448 X" read -- 2,844,615  7/1958  Ziegler et al.----- 260-448 X --.

Signed and sealed this 29th day of April 1969.

(SEAL)
Attest:

Edward M. Fletcher, Jr.

Attesting Officer

EDWARD J. BRENNER

Commissioner of Patents